United States Patent [19]
Benton

[11] Patent Number: 5,501,118
[45] Date of Patent: Mar. 26, 1996

[54] BALL NUT AND SCREW ASSEMBLY WITH PRELOAD RETAINING BALL RETURN TUBE CLAMP

[75] Inventor: Robert L. Benton, Bay City, Mich.

[73] Assignee: Thomson Saginaw Ball Screw Co., Inc., Saginaw, Mich.

[21] Appl. No.: 350,271

[22] Filed: Dec. 5, 1994

[51] Int. Cl.⁶ .................................................. F16H 25/22
[52] U.S. Cl. ................................. 74/441; 74/459; 470/2
[58] Field of Search ........................... 74/441, 459; 470/2

[56] References Cited

U.S. PATENT DOCUMENTS

| | | |
|---|---|---|
| 2,779,207 | 1/1957 | Hamilton . |
| 3,059,494 | 10/1962 | Grabowski et al. . |
| 3,062,070 | 11/1962 | Beatty et al. .................... 74/441 X |
| 3,124,969 | 3/1964 | Grabowski et al. . |
| 3,372,605 | 3/1968 | Omer ................................. 74/459 |
| 3,703,835 | 11/1972 | O'Connor et al. . |
| 3,720,116 | 3/1973 | Better et al. . |
| 3,722,312 | 3/1973 | Better et al. . |

*Primary Examiner*—Allan D. Herrmann

[57] ABSTRACT

A ball nut and screw assembly has a ball screw mounting a nut assembly comprising a pair of ball nuts with the respective grooves of the screw and nut defining a pair of ball train accommodating axially spaced helical raceways. At least one preloading member is mounted between the nuts for imposing a preload on the raceways. External ball return tubes for each of the nuts communicate with opposite ends of each of the raceways for recirculating balls from one end of each raceway to the other. A unitary ball return tube clamp plate extends across the preloading member to clamp each of said ball return tubes to their respective nuts and fasteners extend between each of the nuts and the ends of the clamp plate for securing the return tubes in position while permitting the clamp plate to retain the nuts in preloaded condition.

9 Claims, 3 Drawing Sheets

5,501,118

BALL NUT AND SCREW ASSEMBLY WITH PRELOAD RETAINING BALL RETURN TUBE CLAMP

BACKGROUND OF THE INVENTION

This invention relates to relatively inexpensively produced ball nut and screw assemblies which can accordingly be marketed very inexpensively.

Typically, such ball nut and screw assemblies include screws with rolled threads, rather than ground threads, and rolled threads, from a precision point of view, will have lead errors which are not to be found in screws having ground helical grooves. Also typically, the nuts for this type of ball nut and screw assembly will be steel nuts in which the grooves are less expensively formed in tapping operations as opposed to grinding operations. Again, such nuts will be more subject to lead errors from a high precision point of view and, when assembled on screws, lash conditions will typically exist between the nut and screw. Normally, such inexpensive ball nut and screw structures have further included external ball return tubes and clamps for clamping the ball return tubes to flat faces provided on the nuts via fasteners which extended from the clamp plates into the nuts.

SUMMARY OF THE INVENTION

The present invention is concerned with a multiple nut construction in which a preload creating member may be provided between a pair of ball nuts having grooved portions which, with the grooved portions of the screw, define a pair of axially spaced helical raceways. The preload creating member urges the nuts in axially opposite directions and imposes a preload on the grooved portions of the raceways to overcome axial lash in the screw and nut. An elongate ball return tube clamp plate, having opposed ends secured respectively to each of the nuts, extends from one of the nuts to the other across the preload creating spring member to not only clamp both ball return tubes in position, but also to normally maintain the preload which is provided. Thus, the clamp plate is a multi-function device in the sense that it not only clamps the ball return tubes in position, but also prevents relative rotation of the nuts and maintains the preload which is set up in the ball screw and nut assembly in the first place.

One of the prime objects of the present invention is to produce a very inexpensively manufactured, preloaded ball nut and screw assembly which uses standardly mass-produced ball nuts.

Still another object of the invention is to provide an assembly of the character described which has a high forgiveness quotient for lead error and can be used where lead errors are relatively greater.

Still another object of the invention is to provide a very economically preloaded ball nut assembly using a multi-purpose unitary clamp plate to maintain the position of a pair of ball return tubes.

Another object of the invention is to provide a stand alone preloaded dual ball nut and screw assembly of the character described wherein the pair of ball nuts are prevented from relatively rotating without the need of providing a surrounding housing to prevent the nuts from relatively rotating.

Still a further object of the invention is to provide an assembly of the character described wherein a construction is provided which is adjustable for nut and screw wear over the consequently longer operating life of the device.

A further object of the invention is to provide a simple, yet durable, ball nut and screw assembly which stays preloaded, and whose preload can be varied by increasing or decreasing the number of resilient members which are used between the pair of ball nuts in the assembly.

A further object of the invention is to provide an assembly of the character described in which the ball nuts are restrained from relatively tipping up or down by the unitary, multi-function return tube clamp plate which has an interiorly shouldered surface commonly engaging them.

Still a further important object of the invention is to provide a preloaded ball nut and screw assembly of the type described which can be very simply and easily assembled.

Other objects and advantages of the invention will become apparent with reference to the accompanying drawings and the accompanying descriptive matter.

THE DRAWINGS

PRIOR ART DESCRIPTION

Figure 1:
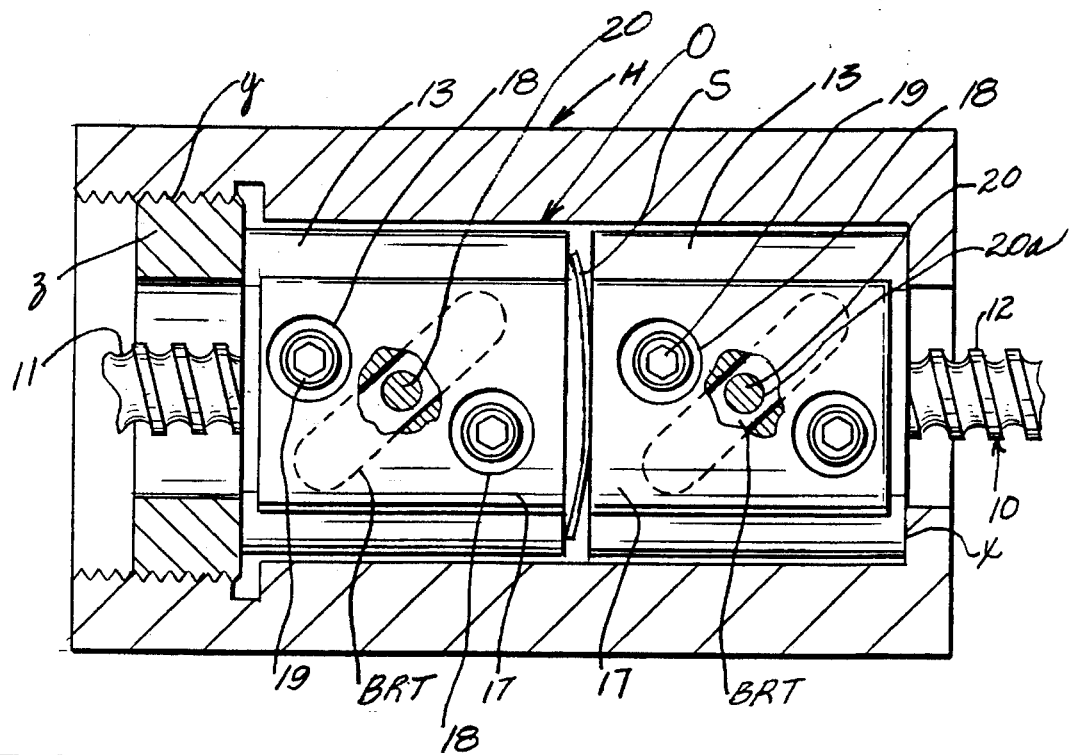
FIG. 1 is a schematic top plan view of a prior art ball nut and screw assembly.
Figure 2:
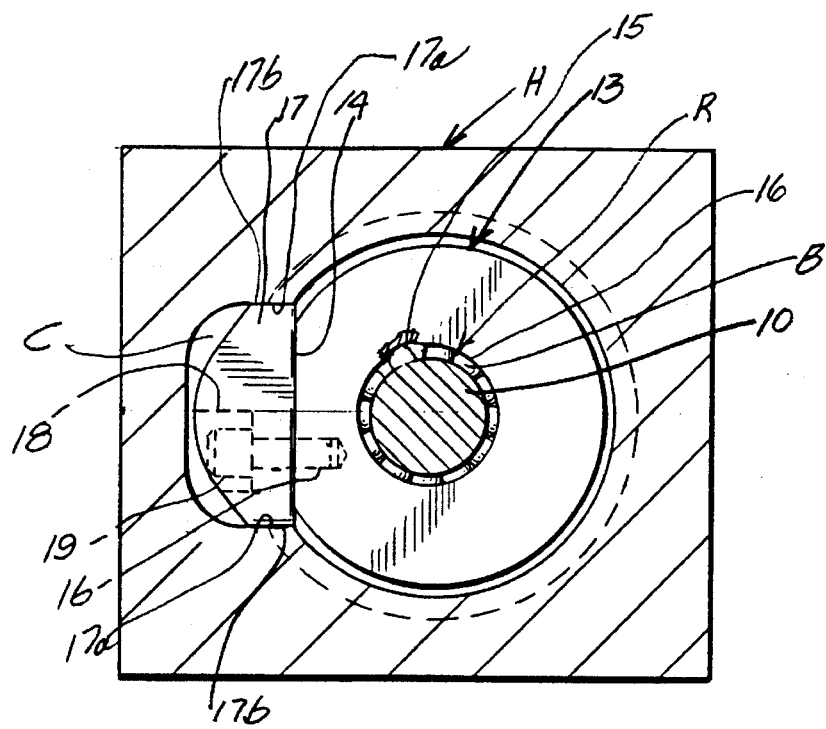
FIG. 2 is a schematic sectional end elevational view thereof.

Referring now more particularly to the accompanying drawings, and in the first instance to FIGS. 1 and 2, wherein a prior art structure is depicted, the member 10 is a typical steel screw having helical grooves 11 and lands 12. Mounted thereon are conventional ball nuts 13, which are cylindrical in configuration except for flatted surfaces 14. The nuts 13 typically have helical grooves 15 and lands 16 which complement the screw grooves and lands such that a pair of ball raceways, generally designated R, is formed between them. They are separated by a preloading spring S which imposes a preload upon them.

Provided to transfer the train of balls B from one end of each nut 13 to the other are U-shaped ball return tubes BRT which have ends extending into the usual ball return passages provided in the end portions of nuts 13 to communicate with each ball raceway R. An individual clamp plate 17 is provided for holding each ball return tube BRT in position and has a pair of inset recesses 18 in which fasteners such as socket head screws 19 are received for securing the clamp plates 17 in position on opposite sides of the ball return tubes BRT. The screws 19 extend into threaded openings 19a provided in the nuts 13 in the usual manner. Provided on the interior wall of each clamp plate 17 is an interior projection 20 which engages the ball return tube BRT to plug the ball-loading opening 20a therein and hold it in position when the individual clamp plate 17 is secured by fasteners 19.

It will be observed in FIG. 2 that the clamp plates 17 have flat sides 17a. A surrounding housing H has an opening O for receiving the ball nut and screw assembly. This opening includes a clearance passage C for receiving the plates 17 which have side walls 17b for closely receiving the plates 17 and preventing relative rotation of the nuts 13 to which they secure.

One end of the housing H includes flanges x and the other end is provided with a threaded opening y within which a spanner nut z is threaded which bears on the one nut 13 to retain the nuts 13 in the desired assembled preloaded position.

GENERAL DESCRIPTION OF THE INVENTION

Figure 3:
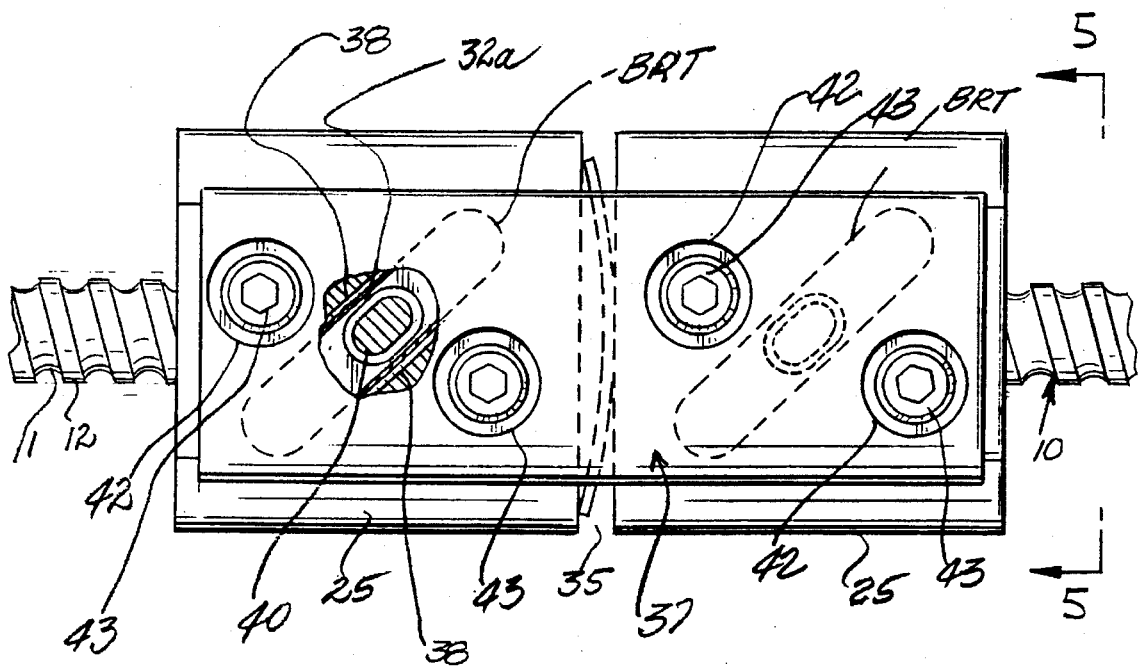
FIG. 3 is a schematic plan view of the ball nut and screw assembly of the present invention.
Figure 5:
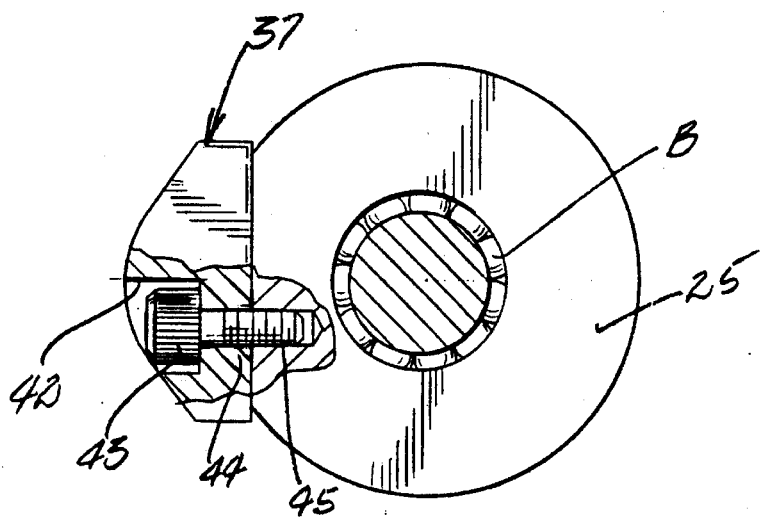
FIG. 5 is an end elevational view thereof taken on the line 5—5 of FIG. 3.
Figure 4:
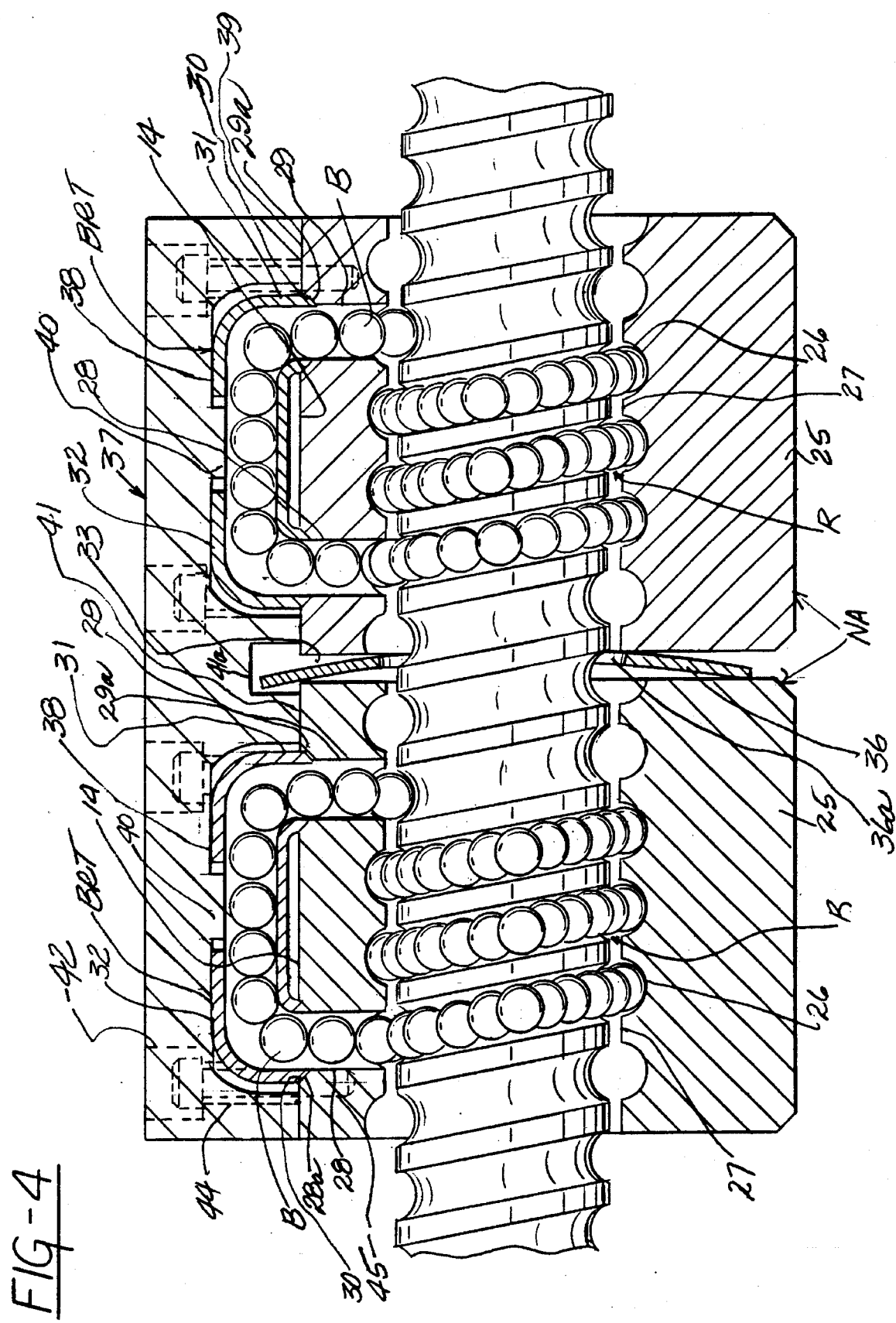
FIG. 4 is an enlarged, schematic, sectional elevational view thereof.

In FIGS. 3–5, I have shown the preferred embodiment of the present invention wherein, for the sake of convenience, the same numbers have been used to designate the same parts of the screw. A nut assembly, generally designated NA, is shown as comprised of a pair of nuts 25, each of which has internal helical grooves 26 and lands 27 (FIG. 4). The screw grooves 11 and nut grooves 26 are helically complemental to provide twin helical raceways, also generally designated R, for the steel balls B which are provided in abutting relationship in each raceway R.

As is apparent in FIG. 3, each of the nuts 25 includes a pair of ball return passages 28 and 29 which are chamfered at their outer ends as at 28a and 29a to receive the similarly chamfered surfaces 30 provided on the ends 31 of the U-shaped ball return tubes BRT which have a leg connecting-mediate section 32. It will be observed that the nuts 25 are axially spaced apart as at 33 to receive a preload-creating member 36 between them.

As shown in the drawings, the preloading member 36 takes the form of a so-called resilient wave spring, which may also be described as a leaf spring, or may comprise a Belleville washer. It may also comprise a non-resilient steel washer or shim in a case where a screw with ground grooves instead of rolled grooves is utilized. Dependent on the preload desired, one or more such members 36 may be provided in the space 35. It is to be noted that the resilient member 36 is bored as at 36a so that it freely passes the screw 10, without in any way interfering with its operation.

Provided to engage the co-extensive flat surface 14, provided on each of the nuts 25, is a unitary multi-function, return tube clamp plate, generally designated 37, which is recessed as at 38 to accommodate each of the ball return tubes BRT. The configuration provides flat end base surfaces 39 which engage the outer ends of nuts 25, ball return tube insert projections 40 which plug the elongate ball load openings 32a in tube sections 32, and a flat surfaced shoulder 41 which spans and engages the flat surfaces 14 on the inner ends of each of the nuts 25. The surface 41 is provided with an enlarged groove 41a to freely accommodate the end of annular member 36. The clamp plate 37 is preferably an inexpensively molded synthetic plastic member.

To hold the unitary clamp plate 37 in position, enlarged counterbores 42 are provided in the clamp plate 37, and socket head screw or shoulder bolt fasteners 43 may extend through enlarged passages 44 into threaded openings 45 provided in the nuts 25 on opposite sides of each of the ball return tubes BRT, as shown in FIG. 4.

THE ASSEMBLY

To assemble the ball nut and screw structure or device, one of the nuts 25 is first threaded onto the screw 10 and the preloading member 36 is then placed over the end of the screw and slid into abutting position with this first nut 25. The second nut 25 is then threaded into position and rotated until the member 36 is compressed and the flat surfaces 14 provided on the nuts 25 are in planar alignment. After the member 36 is compressed and surfaces 14 aligned, top loading of the balls 28 is accomplished through the openings 32a provided in the ball return members BRT. Thereafter, the preload retaining clamp plate 39 can be placed in position with relief slot 41a receiving the upper edge of the resilient member 36 and undersize projections 40 effectively plugging the openings 32a sufficiently to prevent the escape of balls 28. Attention is directed to FIG. 4 from which it will be noted that the openings 32a and 38 are enlarged axially relative to the protrusions 40 such that axial shifting of the nuts 25 is accommodated.

It is to be understood that varying preloads can be imposed by the resilient member 36, i.e., in the range of ½ to 12-½ pounds. The preload will effectively be accomplished before the clamp plate 39 is placed in position and fasteners 43 secured.

In operation, the clamp plate 39 maintains the desired preload. By engaging the surfaces 14 of each of the nuts 25 at 41, relative rotation of the nuts 25 is also effectively prevented. As wear occurs, the socket head screws 43 can be loosened so that the nuts 25 can automatically compensate for wear under the spreading force of resilient member 36.

Normally, the force exerted by spring 36 will not be sufficient to overcome the clamping force exerted by the fasteners 43. However, in some applications, the fasteners may not be fully tightened down and the nuts 25 may be permitted to automatically spread and compensate for wear.

It is to be understood that the embodiments described are exemplary of various forms of the invention only and that the invention is defined in the appended claims which contemplate various modifications within the spirit and scope of the invention.

I claim:

1. In a ball nut and screw assembly:
   a) an exteriorly threaded, axially extending screw having exterior helical groove portions;
   b) a nut assembly comprising a pair of nuts on said screw having interior helically complementally grooved portions, the respective groove portions of the screw and nut defining a pair of axially spaced helical raceways;
   c) a train of load transfer bearing balls accommodated in each of said raceways;
   d) at least one preloading member between said nuts for imposing a preload on said groove portions of the raceways;
   e) external ball return tubes for each of said nuts having ends which communicate with opposite ends of each of said raceways for recirculating balls from one end of each raceway to the other;
   f) an elongate unitary ball return tube clamp plate having opposed ends fastened respectively to a different one of said nuts extending across said preload creating member to clamp each of said ball return tubes to their respective nuts; and
   g) fasteners extending between each of said nuts and the ends of said clamp plate for securing said return tubes in position and permitting said clamp plate to retain said nuts in preloaded condition.

2. The ball nut and screw assembly of claim 1 wherein said member comprises a resilient member surrounding said screw which is out of contact therewith.

3. The ball nut and screw assembly of claim 1 wherein said clamp plate includes interior projections bearing on both of said ball return tubes.

4. The ball nut and screw assembly of claim 3 wherein said clamp plate has an interior surface spanning and bearing also on each of said ball nuts.

5. The ball nut and screw assembly of claim 4 wherein a pair of ball return passages are provided in each of said nuts at the ends thereof which communicate with one of said raceways, and said ball return tubes comprise axially diagonally extending, generally U-shaped tubes having ends which seat in said ball return passages and communicate therewith, said tubes having ball load openings therein which are plugged by said clamp plate projections.

6. The ball nut and screw assembly of claim 5 wherein said nuts have aligned flat surfaces in which said ball return passages are provided and said clamp plates have an interior shoulder which spans said space between said nuts and bears on said flat surfaces of the nuts.

7. The ball nut and screw assembly of claim 5 wherein said fasteners extend in pairs at opposite sides of each ball return tube.

8. The ball nut and screw assembly of claim 1 wherein openings are provided in the ends of said clamp plate to receive said fasteners, and said openings in said clamp plate are elongate axially to permit said fasteners to adjust to movement of said nuts axially relative to one another.

9. In a method of assembling a ball nut and screw assembly comprising an exteriorly threaded, axially extending screw having exterior helical groove portions; a nut assembly comprising a pair of nuts on said screw having interior helically complementally groove portions, the respective groove portions of the screw and nuts defining a pair of axially spaced helical raceways; a train of load transfer bearing balls accommodated in each of said raceways; a preload creating member between said nuts compressible for imposing a preload on said groove portions of the raceways; external ball return tubes for each of said nuts having ends which communicate with opposite ends of each of said raceways for recirculating balls from one end of each raceway to the other, said tubes having ball load openings therein; an elongate clamp plate having opposed ends fastened respectively to a different one of said nuts and extending over said ball return tubes to stop off said ball load openings, said clamp plate extending from one of said nuts to the other across said resilient member; and fasteners extending between each of said nuts and the ends of said clamp plate for securing said return tubes in position; the steps of:

a) screwing one of said nuts on said screw;

b) axially moving said preloading member over said screw to a position of adjacency therewith;

c) screwing a second nut on said screw to a position in which said preloading member is compressed;

d) loading said train of balls through said return tubes to each nut; and e) applying said clamp plate over said ball return tubes to stop-off the ball load openings therein and fastening said clamp plate to each of said nuts to clamp said ball return tubes and retain said nuts in preloaded condition.

\* \* \* \* \*